(12) United States Patent
Miles et al.

(10) Patent No.: US 7,311,828 B2
(45) Date of Patent: Dec. 25, 2007

(54) WALL MOUNT FOR WATER TREATMENT SYSTEM

(75) Inventors: Michael E. Miles, Grand Rapids, MI (US); Terry L. Lautzenheiser, Nunica, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 11/204,576

(22) Filed: Aug. 16, 2005

(65) Prior Publication Data

US 2007/0039863 A1    Feb. 22, 2007

(51) Int. Cl.
*B01D 35/30* (2006.01)
(52) U.S. Cl. .................. 210/232; 210/249; 210/541; 248/221.12; 248/222.41; 248/223.21
(58) Field of Classification Search ........... 210/249, 210/541, 748, 232; 248/221.12, 222.41, 248/223.21
See application file for complete search history.

(56) References Cited

U.S. PATENT DOCUMENTS

| | | | | |
|---|---|---|---|---|
| 776,550 A | * | 12/1904 | Rice | 210/414 |
| 1,464,322 A | * | 8/1923 | Kolster | 375/339 |
| 1,464,822 A | * | 8/1923 | Justus | 210/249 |
| 1,624,689 A | * | 4/1927 | Sweetland | 184/6.24 |
| 2,468,866 A | * | 5/1949 | Collier | 210/186 |
| 3,487,935 A | | 1/1970 | Lovitz | |
| 3,595,399 A | * | 7/1971 | Abos et al. | 210/266 |
| 3,717,253 A | | 2/1973 | Lovitz | |
| 4,718,085 A | | 1/1988 | Haskins | |
| 4,769,131 A | * | 9/1988 | Noll et al. | 210/85 |
| 4,806,240 A | * | 2/1989 | Giordano et al. | 210/232 |
| 4,971,687 A | * | 11/1990 | Anderson | 210/85 |
| 5,060,891 A | | 10/1991 | Nagy et al. | |
| 5,069,782 A | * | 12/1991 | Moyher et al. | 210/192 |
| RE34,050 E | | 9/1992 | Thomsen et al. | |
| 5,151,180 A | * | 9/1992 | Giordano et al. | 210/264 |
| 5,304,300 A | * | 4/1994 | Parsons | 210/86 |
| 5,451,791 A | * | 9/1995 | Mark | 250/438 |
| 5,472,157 A | | 12/1995 | Lehrman | |
| 5,536,395 A | | 7/1996 | Kuennen et al. | |
| 5,762,787 A | | 6/1998 | Park et al. | |
| 5,850,440 A | | 12/1998 | Hannon et al. | |
| 6,245,229 B1 | | 6/2001 | Kool et al. | |
| 6,259,023 B1 | | 7/2001 | Reiker | |
| 6,375,017 B1 | | 4/2002 | Schattner et al. | |
| 2004/0129617 A1 | * | 7/2004 | Tanner et al. | 210/210 |

* cited by examiner

*Primary Examiner*—Thomas M. Lithgow
(74) *Attorney, Agent, or Firm*—Warner Norcross & Judd (57) ABSTRACT

A wall mount for attaching water treatment system to a wall plate consists of a platform and a vertical portion. The water treatment system rests on the platform. The water treatment systems extend through the back of the wall mount and extend through passages in the wall mount and into the water treatment system. The water tubes, when placed within the water treatment system, assist in maintaining the water treatment system on the wall mount.

18 Claims, 7 Drawing Sheets

WALL MOUNT FOR WATER TREATMENT SYSTEM

BACKGROUND OF THE INVENTION

The present invention relates to water treatment systems.

Individual or family water treatment systems are increasingly popular. They provide treatment for water in order to improve quality of water.

Generally, a water treatment system is used by connecting an inlet tube from a water source to the water treatment system, and an outlet tube from the water treatment system to a spigot, dispenser, tap, or reservoir. Water enters the inlet tube, is treated within the water treatment system, and then is channeled through the outlet tube. The water treatment system is usually electrically powered. The water treatment system is often kept near a source of water, such as a sink or fountain.

However, consumers have different desires as to placement of a water treatment system. Some consumers desire the water treatment system to be free standing so that it can be easily moved and stowed when not in use. Other consumers desire the attachment of the water treatment system to a wall.

A means for attachment of the water treatment system to a wall must provide a number of solutions to different problems. The water system inlet and outlet tubes must not be crimped during installation. The electrical chord for the power to the water treatment system must be properly stowed. Since the water treatment system could be prominently displayed on a wall, the water treatment system should be aesthetically appealing. Finally, the installation of the water treatment system on the wall should be relatively simple.

Figure 3:
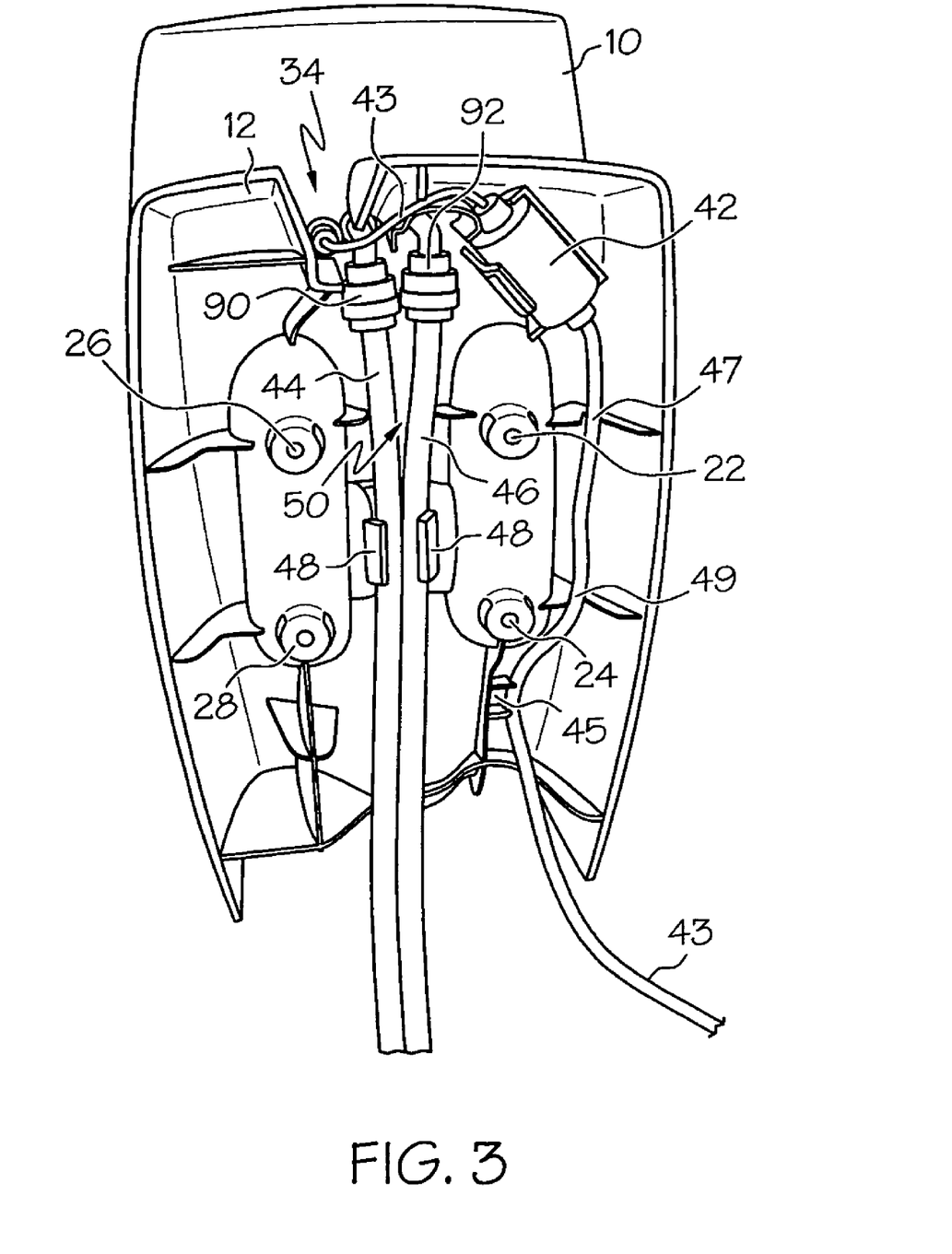
FIG. 3 shows the reverse side of the wall mount when connected to water treatment system.

U.S. Pat. No. 6,245,229 shows a water treatment system which is attachable to the wall. As shown in FIG. 3 of that patent, the water treatment system's back cover is configured so as to be directly attachable to a wall bracket. The back cover was thus not as aesthetically pleasing as the remainder of the water treatment system.

SUMMARY OF THE INVENTION

The aforementioned problems are overcome in the present invention. A wall mount for attaching water treatment system to a wall plate consists of a platform and a vertical portion. The water treatment system rests on the platform. The water tubes extend through the back of the wall mount and extend through passages in the wall mount and into the water treatment system. The water tubes, when placed within the water treatment system, assist in maintaining the water treatment system on the wall mount.

The wall mount also includes a channel for holding the water tubes. Tab hooks within the channel hold the water tubes in the channel.

The power cable for the water treatment system is held in the back of the vertical portion by way of a clip. A balun receptacle for holding a balun transformer is also located in the wall mount. The wall mount includes a plurality of rearwardly extending buttons for connection to the wall plate.

Thus, a user desiring to use the water treatment system on a table top will be presented with an attractive enclosure devoid of any protrusions for attaching the water treatment system to the wall. On the other hand, a user desiring to mount the water treatment system to the wall will be able to do so with little difficulty using the wall mount. Such a wall mount is able to contain the water tubes and the power cables within an attractive enclosure, and thereby present an overall pleasing appearance to a user.

These and other objects, advantages and features of the invention will be more readily understood and appreciated by reference to the detailed description of the drawings.

DETAILED DESCRIPTION OF THE DRAWINGS

Figure 1:
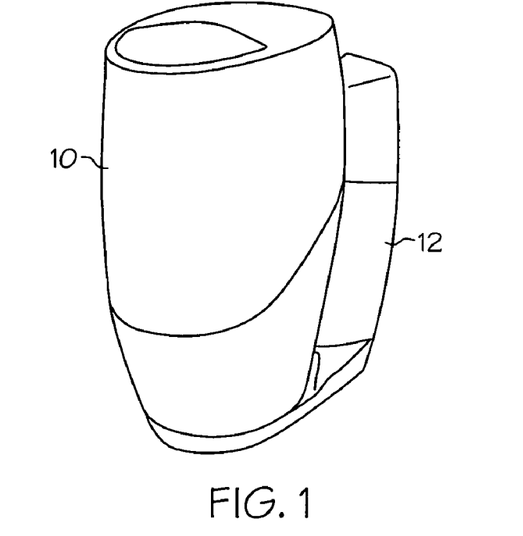
FIG. 1 shows a water treatment system attached to a wall mount.

FIG. 1 shows water treatment system 10 attached to wall mount 12.

Figure 2:
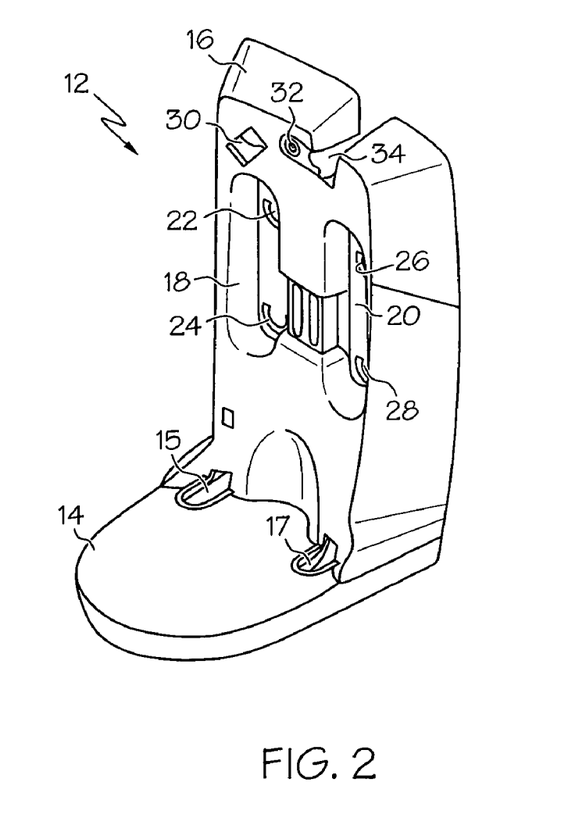
FIG. 2 shows a perspective view of the wall mount for the water treatment system.

FIG. 2 shows a perspective view of wall mount 12. Wall mount 12 consists of platform 14 and vertical portion 16. Water treatment system 10 sits upon platform 14.

Vertical portion 16 includes cavities 18, 20. Buttons 22, 24, 26, 28 are located within cavities 18, 20 are for connection to wall plate 70 and extend outward through the back of vertical portion 16. Circular aperture 32 is a passage through which outlet tube elbow 92 for water treatment system 10 is fitted, as described in more detail below. Slot 34 allows for fitting inlet tube elbow 90 into water treatment system 10, as well as electrical power cable 43, as described in more detail below.

Platform 14 includes foot slots 15, 17. Foot slots 15, 17 interact with feet 100, 102 on the base on water treatment system 10 to hold water treatment system on wall mount 12.

FIG. 3 shows the reverse side of a wall mount 12 when connected to water treatment system 10. Balun transformer 42 is placed within receptacle 64. Power cable 43 extends from balun transformer 42 through slot 34 to water treatment system 10. Clip 45 holds power cable 43 within wall mount 12. Power cable 43 is fitted within notches 47, 49.

Outlet tube elbow 92 extends through circular aperture 32 to water treatment system 10, while inlet tube elbow 90 extends through slot 34 to water treatment system 10. Buttons 22, 24, 26, 28 provide a way for interlocking with wall plate 70. Tab hooks 48 hold inlet tube 44 and outlet tube 46 within tube channel 50.

Figure 4:
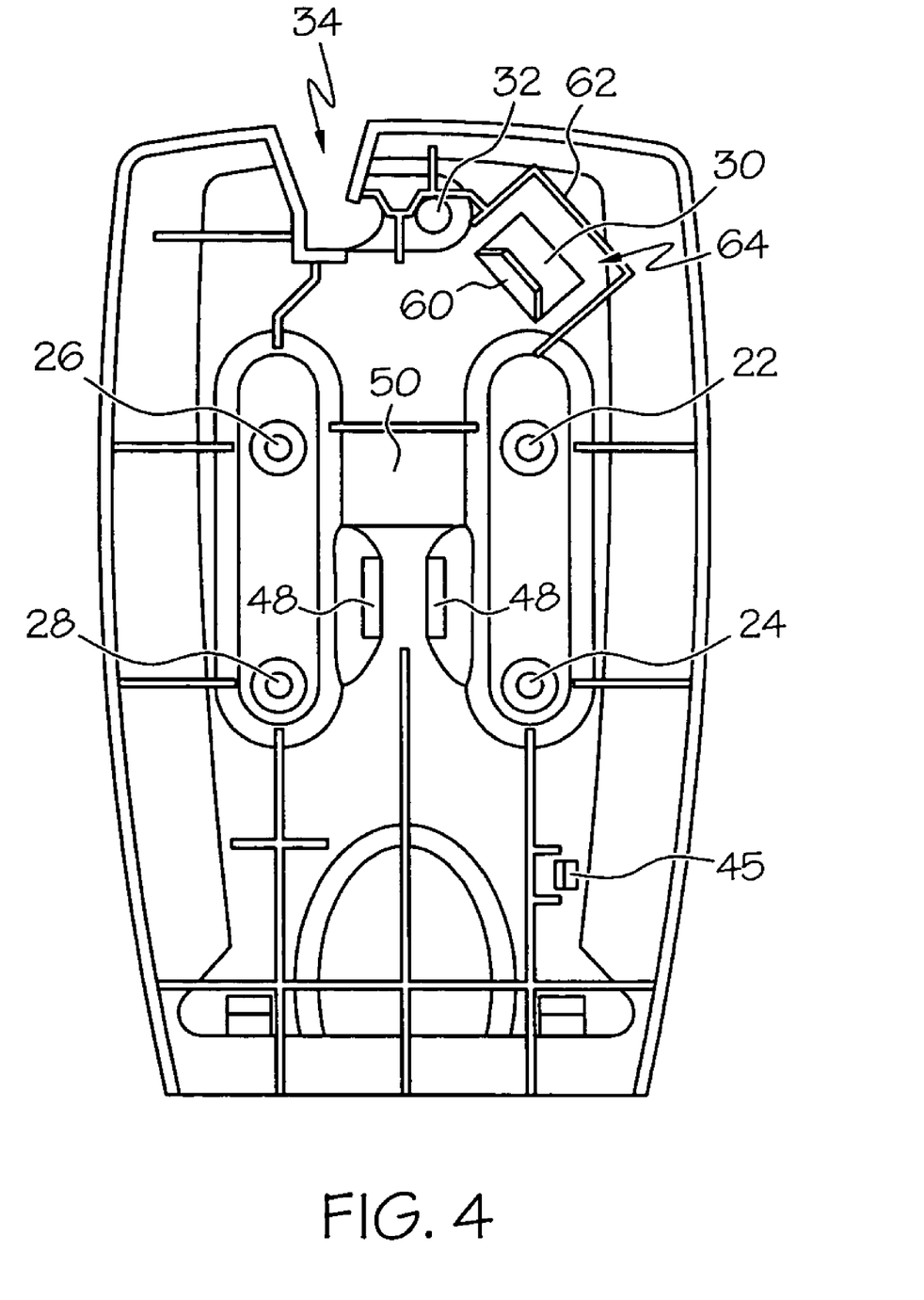
FIG. 4 shows the reverse side of the wall mount.

FIG. 4 shows the reverse side of wall mount 12 without connection to a water treatment system. Flexible tab 60 along with side walls 62 form balun receptacle 64. Flexible tab 60 firmly seats balun transformer 42 within balun receptacle 64. To remove balun transformer 42 from balun receptacle 64, a force is applied on flexible tab 60 to thereby provide additional space for the removal of balun transformer 42.

Figure 5:
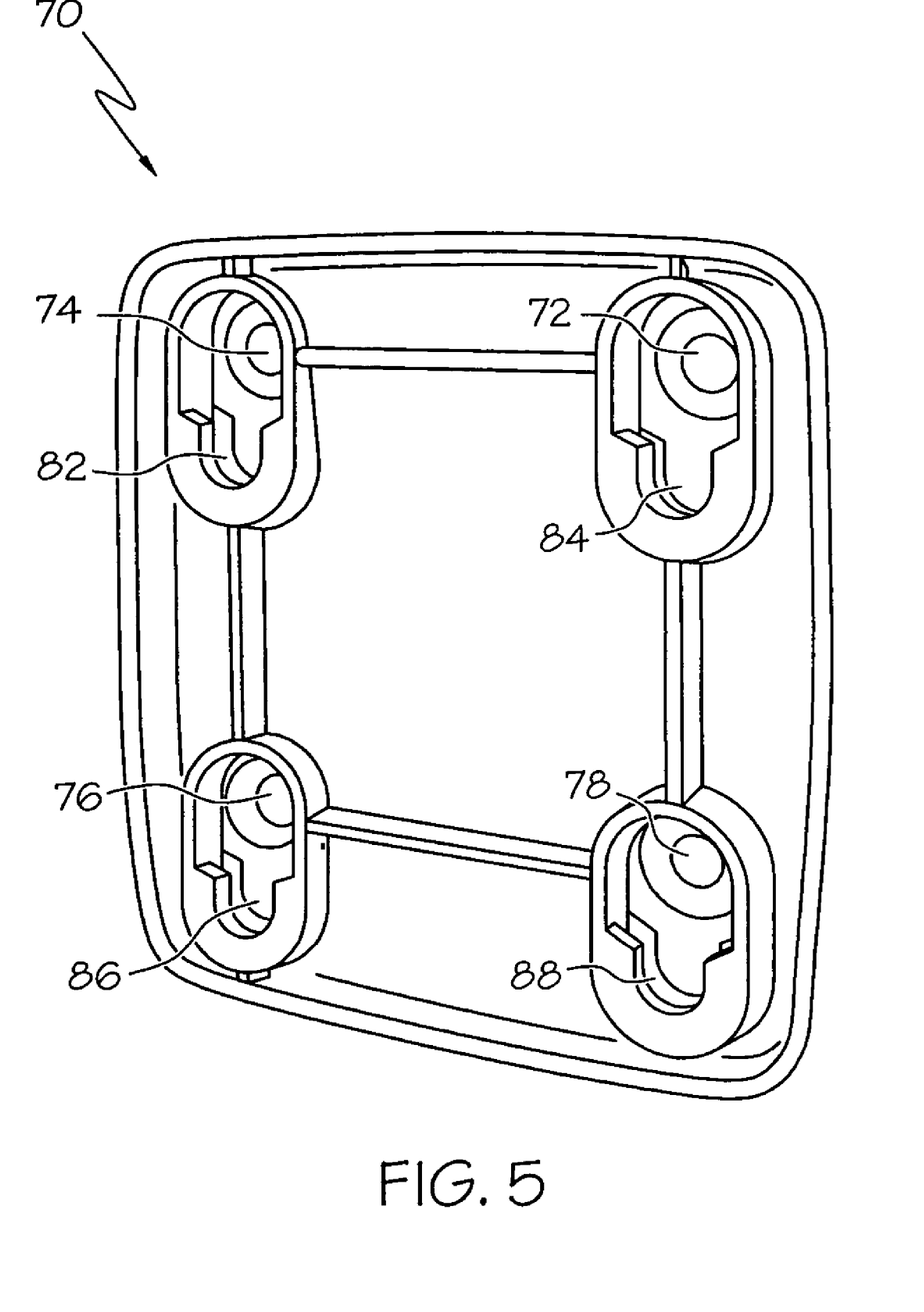
FIG. 5 shows a wall plate.

FIG. 5 shows wall plate 70. Wall plate 70 includes screw holes 72, 74, 76, 78 for affixing the wall plate to a wall. Wall plate slots 82, 84, 86, 88 accommodate buttons 22, 24, 26, 28, thereby allowing the attachment wall mount 12 to wall plate 70.

In operation, a user first affixes wall plate 70 to a wall with four screws. The user then installs the components within wall mount 12. Outlet tube elbow 92 is fitted with outlet tube 46 and placed through circular aperture 32, while inlet tube elbow 90 is fitted with inlet tube 44 and placed within slot 34, thereby securing water treatment system 10. Inlet tube 44 and outlet tube 46 are connected to inlet tube elbow 90 and outlet tube elbow 92 respectively, and then placed within tube channel 50 and within tab hook 48, thereby securing the tubes with the vertical portion of the wall mount. The user then places balun transformer 42 within balun receptacle 64. Power cable 43 is fitted within clip 45 and notches 47, 49. Wall mount 12 is then fitted to wall plate 70.

Figure 6:
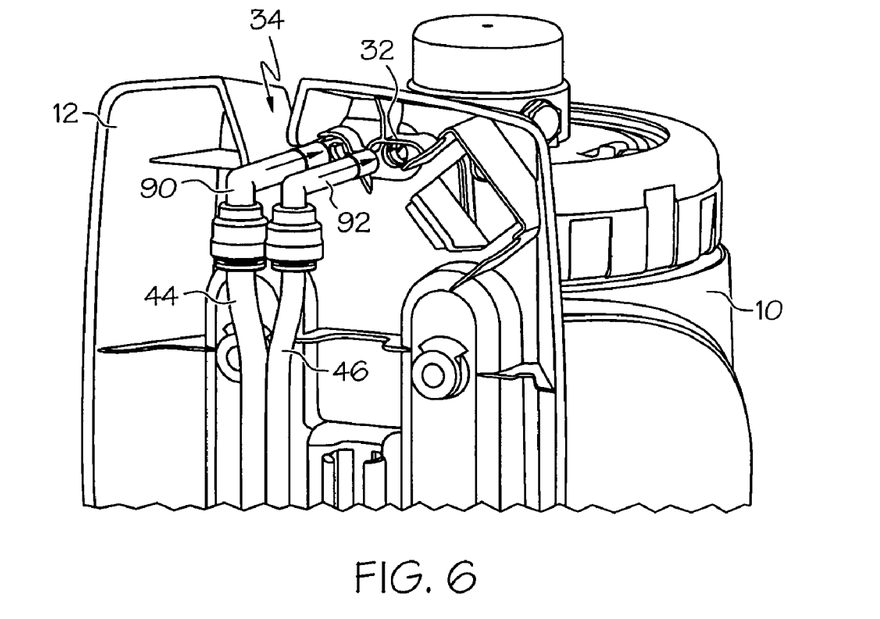
FIG. 6 shows the attachment of the water treatment system to the wall mount.

FIG. 6 shows the attachment of water treatment system 10 to wall mount 12. As shown in FIG. 6, inlet tube 44 is fitted with inlet tube elbow 90, while outlet tube 46 is fitted with outlet tube elbow 92. Water treatment system 10 is shown with its cover removed. Water treatment system 10 is placed on platform 14, aligning water treatment system feet 100, 102 with foot slots 15, 17. Outlet tube elbow 92 is pushed through circular aperture 32 and coupled with a water outlet connection 96 of water treatment system 10, while inlet tube elbow 90 is positioned within slot 34 and coupled with a water inlet connection 94 of water treatment system 10. Outlet tube 46 and inlet tube 44 are then fitted within tab hooks 48.

Figure 7:
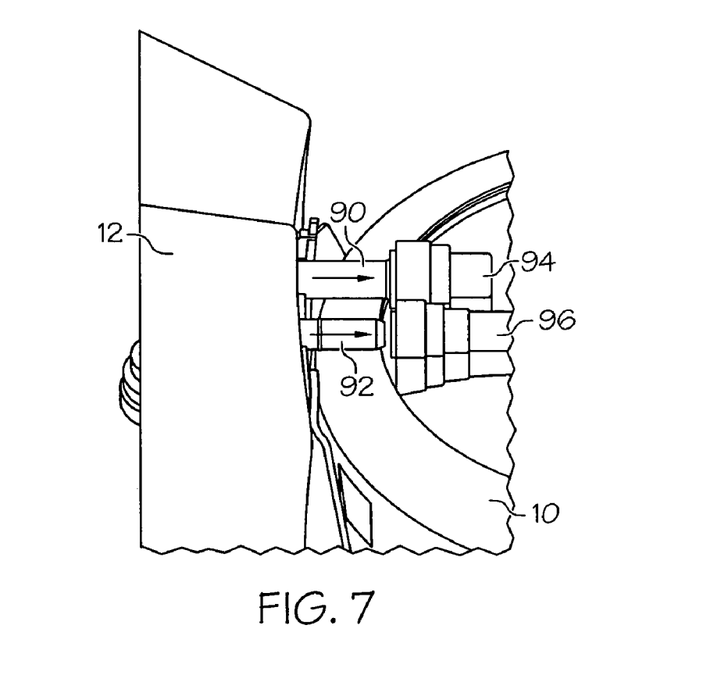
FIG. 7 shows a top view of the water treatment system attached to the wall mount.

FIG. 7 shows water treatment system 10 after attachment to wall mount 12. Inlet tube elbow 90 is fitted within water treatment system inlet 94 while outlet tube elbow 92 is fitted within water treatment system outlet 96. The fitting of tube elbows 90, 92 within inlet 94 and outlet 96 is relatively tight, thereby providing resistance to movement of water treatment system 10 away from wall mount 12. The cover of water treatment system 10 is then replaced.

Figure 8:
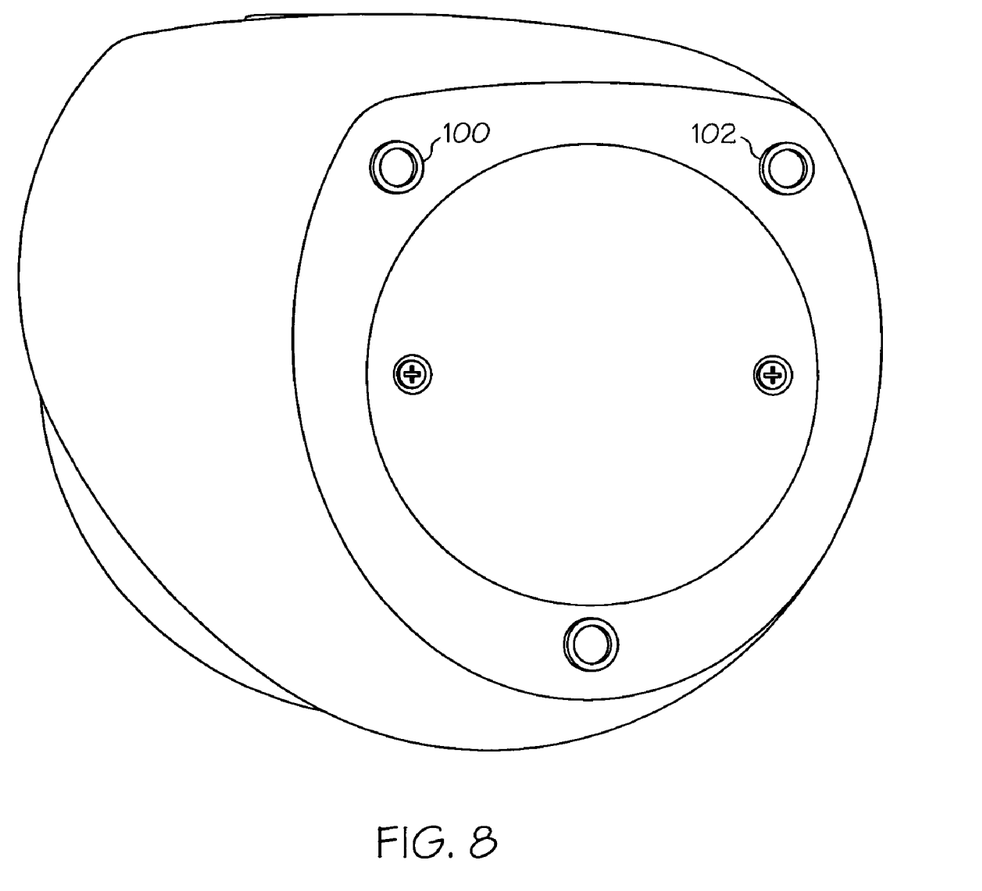
FIG. 8 shows the bottom of the water treatment system.
Figure 9:
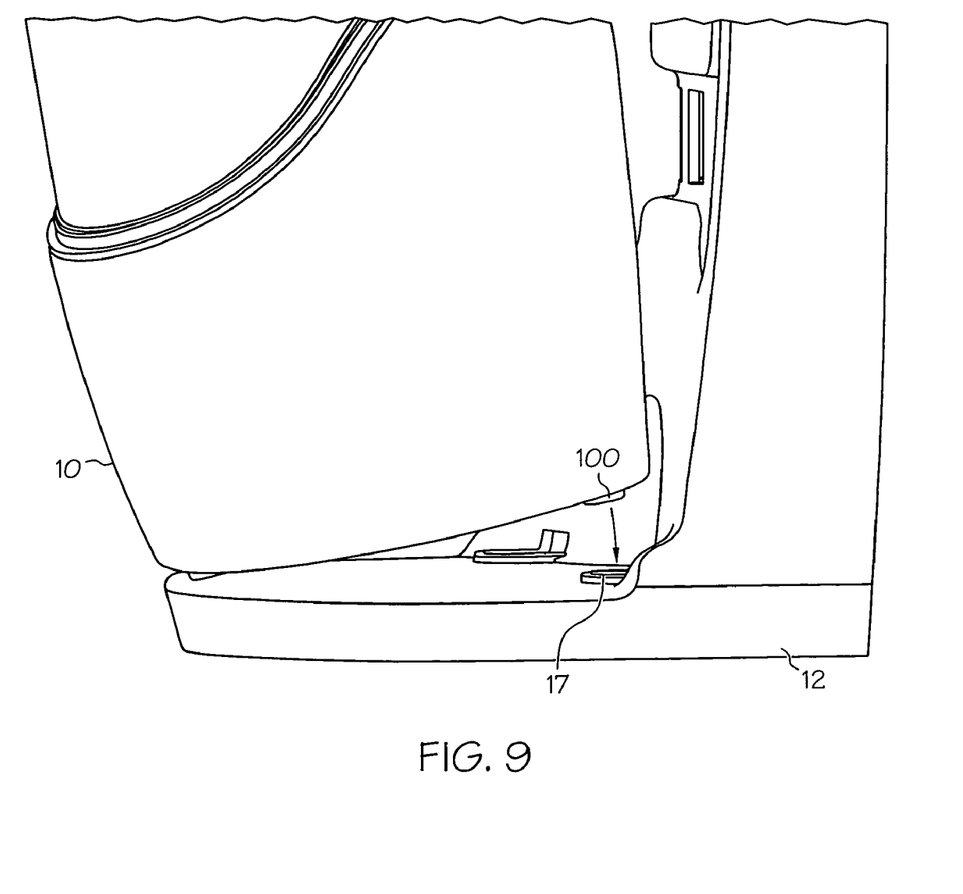
FIG. 9 shows the attachment of the bottom of the water treatment system to the wall mount.

FIG. 8 shows the base of water system 10. Water treatment system 10 includes feet 100, 102. As shown in FIG. 9, feet 100, 102 align with foot slots 15, 17. When seated within foot slots 15, 17, feet 100, 102 assist in maintaining water system 10 on wall mount 12.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A wall mount system for a water treatment system including a bottom and a water treatment system housing comprising:
   a wall plate; and
   a wall mount, the wall mount separate from, but attachable to, the water treatment system housing and to the wall plate, the wall mount including a platform and a vertical portion;
   at least one water flow fitting on the vertical portion of the wall mount, wherein the water treatment system housing is retained on the platform by seating the bottom of the water treatment system on the platform and attaching, by the at least one water flow fitting, the top of the water treatment system to the vertical portion of the wall mount.

2. The wall mount system of claim 1 where the bottom of the water treatment system includes two nubs which interfit with two depressions on the platform of the wall mount.

3. The wall mount system of claim 1 where the platform is contoured to retain the water treatment system housing.

4. A wall mount system for a water treatment system having a housing comprising:
   a wall plate; and
   a wall mount, the wall mount separate from, but attachable to, the water treatment system housing and to the wall plate, the wall mount having a platform and a vertical portion, at least one water flow fitting on the vertical portion of the wall mount, the wall mount affixed to the water treatment system housing by way of a first water tube attached to the water treatment system and to the water flow fitting on the vertical portion of the wall mount.

5. The wall mount system of claim 4 where the wall mount includes a tube channel for containing the first water tube.

6. The wall mount system of claim 5 where the wall mount has a first passage through which the first water tube extends into the water treatment system housing.

7. The wall mount system of claim 6 where the wall mount is affixed to the water treatment system housing by a second water tube, the second water tube extending through a second passage into the water treatment system housing.

8. The wall mount system of claim 7 further comprising a water tube elbow for attachment to the first water tube, the water tube elbow extending through the first passage.

9. A wall mount for use in attaching a free standing water treatment system to a wall plate affixed to a wall, the water treatment system having a water treatment system housing with a base and a first water tube, comprising:
   a vertical portion which is attached to the wall plate and a platform for supporting the free standing water treatment system, the base of the water treatment system housing retained on the platform by seating the base of the water treatment system housing on the platform when the water treatment system is in place on the wall mount, wherein the base of the water treatment system housing and the platform are contoured to retain the water treatment system;
   a tube channel for holding the first water tube; and
   a first passage in the vertical portion of the wall mount through which the first water tube extends, where the first water tube secures the water treatment system to the wall mount.

10. The wall mount of claim 9 further comprising a holding means for holding the first water tube in the tube channel.

11. The wall mount of claim 10 where the water treatment system has a power cable further comprising a clip for holding the power cable.

12. The wall mount of claim 11 further comprising a connection means for connecting the wall mount to the wall plate.

13. The wall mount of claim 12 where the connection means comprises a plurality of buttons for interlocking with the wall plate.

14. The wall mount of claim 13 where the holding means comprises a tab hook.

15. The wall mount of claim 14 where the water treatment system includes a second water tube, the wall mount further comprising a second passage through which the second water tube extends.

16. The wall mount of claim 15 where the first passage is an orifice.

17. The wall mount of claim 15 where the first passage is a slot.

18. The wall mount system of claim 9 where the bottom of the water treatment system housing includes a plurality of nubs which respectively interfit with a plurality of depressions on the platform of the wall mount.

* * * * *